July 21, 1959  EL ROY J. KRAFT  2,895,676
WATER TEMPERING VALVE
Filed Feb. 15, 1956  2 Sheets-Sheet 1
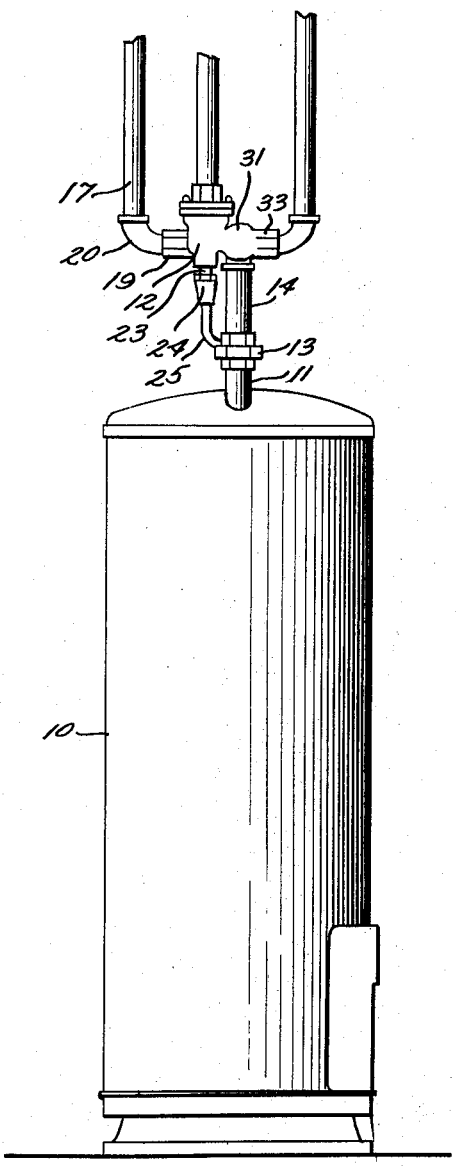
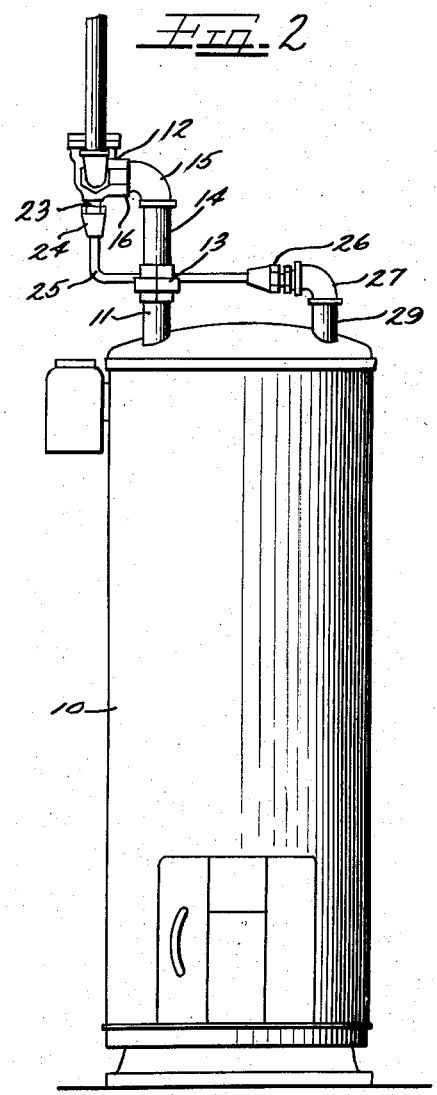
Inventor
ElRoy J. Kraft
By
Attys

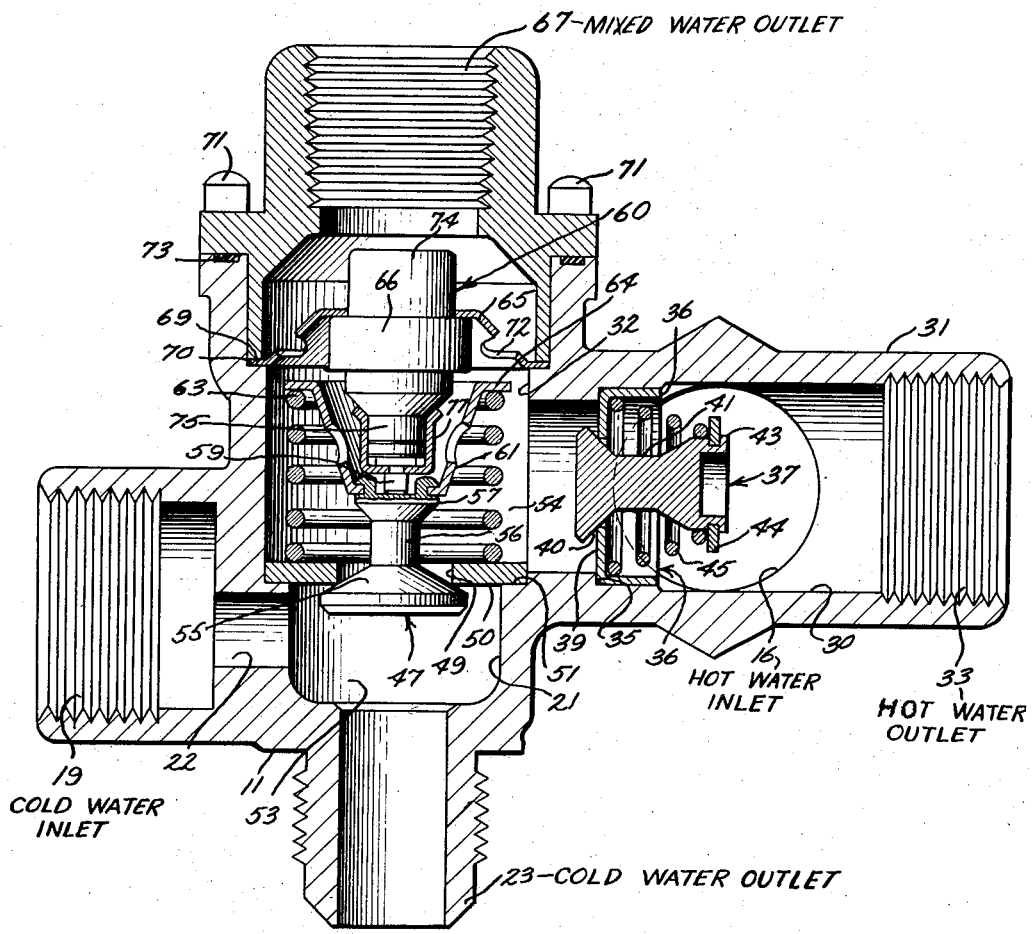

United States Patent Office 2,895,676
Patented July 21, 1959

2,895,676

WATER TEMPERING VALVE

El Roy J. Kraft, Des Plaines, Ill., assignor to The Dole Valve Company, Chicago, Ill., a corporation of Illinois Application February 15, 1956, Serial No. 565,564

2 Claims. (Cl. 236—12)

This invention relates to improvements in mixing valves and more particularly relates to thermostatically controlled mixing valves for tempering water and the like and for supplying water at different temperatures for different purposes.

A principal object of the invention is to provide a new and improved mixing valve of a simplified construction arranged to supply water at different temperatures to be used for different purposes.

Another object of the invention is to provide a new and improved form of thermostatically controlled mixing valve for delivering hot water or an intermediate tempered water.

A further object of the invention is to provide a thermostatically controlled mixing valve adapted for use with a hot water heater for supplying cold water to the heater, supplied with hot water from the heater and arranged to supply hot water for one use and tempered water for another use.

Still another object of the invention is to provide a simple and improved form of mixing valve adapted for use with hot water heaters and the like supplying cold water to the heater, hot water at the temperature delivered by the heater for use in a dishwashing machine and the like, and tempered water under thermostatic control for general household purposes.

Still another object of the invention is to provide a simple and improved form of mixing valve for supplying water to and receiving water from hot water heaters and the like in which mixed hot and cold water is supplied under thermostatic control and hot water is supplied directly through the mixing valve without contacting the cold or mixed water.

These and other objects of the invention will appear from time to time as the following specification proceeds and with reference to the accompanying drawings wherein:

Figure 1 is a view showing a hot water heater with a mixing valve constructed in accordance with my invention connected therewith and showing the mixing valve in side elevation;

Figure 2 is a front end view of a hot water heater showing the mixing valve constructed in accordance with my invention connected therewith, with the mixing valve shown in end elevation; and Figure 3 is a longitudinal sectional view taken through the valve shown in Figure 1.

In Figures 1 and 2 of the drawings, I have shown a conventional form of hot water heater 10 having a hot water outlet pipe 11 leading upwardly therefrom having connection with a valve body 12 through a side wall thereof and offset from the center thereof, through a coupling 13, a pipe 14 connected thereto and an elbow 15 threaded in a hot water inlet 16 in the valve body 12 and connecting the hot water pipe 14 to said valve body.

A cold water inlet pipe 17 is shown as being connected with a cold water inlet 19 into the valve body 11 by means of an elbow 20 threaded therein, and has communication with a chamber 21 extending vertically along the valve body 11 through a reduced diameter passageway 22. The chamber 21 opens to opposite ends of the valve body 11 and has a cold water outlet 23 leading from the lower end thereof and connected with the hot water heater for supplying cold water thereto through a coupling 24, a pipe 25 connected thereto, a second coupling 26 and an elbow 27 connected thereto, and connected with a cold water inlet pipe 29 for supplying cold water to the heater.

The hot water inlet 16 is shown in Figure 3 as leading into a passageway 30 formed in a lateral extension 31 of the valve body. The passageway 30 leads from a wall 32 of the chamber 21 outwardly therefrom beyond the hot water inlet 16 and terminates into a hot water outlet 33, which may be directly connected with a dishwasher and the like. The passageway 30 has a shoulder 35 therein between the chamber 54 and the inlet 16 against which is pressed a retainer 36 for a check valve 37, for retaining the check valve to the passageway 30 by the press fit of said retainer within said passageway. The retainer 36 has an annular flange 39 extending inwardly of the passageway 30, the inner downstream margin of which forms a seat for a conical valve face 40 of the check valve 37. The valve face 40 is shown as extending through the opening defined by the inner margin of the annular flange or shoulder 39, and as terminating into a generally cylindrical stem 41 of a reduced diameter from the diameter defined by the inner margin of the annular flange 39. The cylindrical stem 41 diverges into an enlarged diameter portion 43 of the check valve, having a snap ring 44 thereon forming a seat for the small diameter end of a conical spring 45, seated at its opposite end against the flange 39 of the retainer 36.

The spring 45 may be so loaded as to normally maintain the check valve 37 closed, to supply hot water directly from the hot water inlet 16 through the hot water outlet 33, as when hot water is being supplied for use in a dishwasher and the like. The spring 45 also accommodates opening of the valve by the back pressure thereon to supply hot water to a mixing section 54 of the chamber 21 for mixture with cold water entering the chamber 21 through the inlet 19 under the control of a thermally operated valve 47 engageable with a seat 49 formed in an annular seating member 50. The seat 49 may be pressed fitted within the chamber 21 along the wall 32 into engagement with a shoulder 51 in the chamber 21. The seating member 50 divides the chamber 21 into a lower cold water section 53 and the mixing section or chamber 54 on the downstream side of the valve seat 49.

The valve 47 is shown as having a generally frusto-conical valve face 55 engageable with the seat 49 on the upstream side of the mixing chamber 54 and extending through said seat and terminating in a valve stem 56. The valve stem 56 diverges to an enlarged diameter portion 57 abutted by and extending along a piston or power member 59 of a thermal element 60, for moving the valve 47 out of engagement with the seat 49 upon predetermined increases in temperature of the tempered water in the mixing chamber 54.

The enlarged diameter portion 57 of the valve stem 56 is shown as having the small diameter end of a retainer 61 for a spring 63 snapped or otherwise secured thereto. The spring 63 is seated on the downstream side of the seating member 50 at one end, and against a flange 64 extending outwardly from the large diameter end of the retainer 61 at its opposite end, and serves as a return spring for the valve 47 and power member 59 and to retain the thermal element 60 to a carrier 65 therefor.

The carrier 65 is shown as extending over a heat conductor ring 66 of the thermal element 60 and as being retained within the mixing chamber 54 by an outlet fitting 67 extending within the chamber 54 along the wall thereof and abutting a flange 69 of the carrier 65 and retaining said flange in engagement with a shoulder 70 in the wall 32 of the chamber 54. The carrier 65 confines the mixing water to flow around the thermal element 60 and is provided with passageways leading therethrough accommodating the flow of mixed water around a casing 74 for the thermal element and out of the mixed water outlet 67.

The outlet fitting forms a mixed water outlet and is retained to the valve body by means of machine screws 71 maintaining said fitting in engagement with the flange 69 and with a seal 73 encircling the mixing chamber 54.

The outlet fitting 67 thus forms the upper portion of the mixing chamber around the thermal element 60, as well as a mixed water outlet and retainer for the carrier 65 for the thermal element.

The thermal element 60 may be a well known form of wax or power type of thermal element such as is shown in the Vernet Patent No. 2,368,181 in which a thermally expansible material is contained within the casing 74 of the thermal element and reacts against a flexible membrane (not shown) as the thermally expansible material reaches its fusion point, to extend the power member 59 from a cylinder 75 and thus move the valve 47 into a position to admit cold water into the mixing chamber 54. A cap like guide member 77 is shown as being snapped or otherwise secured to the power member 59 and as having slidable engagement with the cylinder 75 to guide the power member 59 upon extensible movement thereof with respect to said cylinder.

The fusible material contained within the casing 60 may be a wax alone, a wax, a powdered metal heat conductor and a binder or a wax and a metallic wool, the material selected being dependent upon the desired temperature range of operation of the thermal element.

In operation of the valve and assuming that the valve is attached to a hot water heater, as shown in Figures 1 and 2, water will be supplied to the hot water heater through the cold water inlet 19 and outlet 23, while the hot water heater will supply water to the valve through the hot water inlet 16 for mixing with cold water, and for use in its heated state without mixing with cold water. The hot water may pass directly from the inlet 16 through the hot water outlet 33 for use, it being understood that hot water is supplied as soon as a hot water valve (not shown) connected with the outlet 33 may be turned on and that when the passage of hot water through the outlet 33 is shut off, the back pressure of the hot water will cause opening of the check valve 37 and the flow of hot water within the mixing chamber 54 and upwardly around the thermal element 60. This will effect fusion of the thermally expansible material within the casing 74 and extension of the power member 59 from the cylinder 75 and opening of the valve 47 to accommodate the passage of cold water through the port 49 into the mixing chamber 54 for mixture with the hot water therein, to supply a tempered water flowing through the outlet fitting 67.

It may be seen from the foregoing that a novel and efficient unitary mixing valve of a simplified construction has been provided, which is adapted for association with a hot water heater and the like for supplying hot water directly from the heater for use in a dishwasher or other appliance, and for supplying a tempered water for normal household use, and that the mixing valve of my invention provides a unitary five-way valve, resulting in a more efficient tempering of the water than in former valves and simplifying the plumbing that would ordinarily be necessary if individual valves were to be used for the same purpose.

It will be understood that various modifications and variations of the present invention may be effected without departing from the spirit and scope of the novel concepts thereof.

I claim as my invention:

1. In a fluid mixing valve, a valve body having a central chamber therein opening to opposite ends thereof, a hot water inlet leading into said valve body to one side of said central chamber and intermediate the ends of said valve body, a communicating passageway between said hot water inlet and said chamber, a cold water inlet leading into said chamber adjacent one end thereof, a mixed water outlet opening from the opposite end of said chamber from said cold water inlet, a valve seating member in said chamber downstream of said cold water inlet and upstream of said communicating passageway and having a central orifice leading therethrough, a valve engageable with said orifice on the upstream side of said valve seating member, a carrier in said chamber downstream of said communicating passageway and adjacent said mixed water outlet, a thermal element seated on said carrier and having a power member engaging said valve, a retainer mounted on said valve, a spring seated on said seating member and engageable with said retainer and biasing said valve into engagement with said power member and retaining said thermal element in said carrier, a hot water outlet leading directly from said hot water inlet, and a check valve in said communicating passageway loaded to close off the free flow of hot water to said chamber upon the flow of hot water through said hot water outlet, to accommodate the passage of hot water to said mixing chamber to open said first mentioned valve and accommodate the passage of cold water from said cold water inlet into said chamber by the heat of the hot water flowing along said thermal element upon a predetermined back pressure in said hot water outlet.

2. In a fluid mixing valve, a valve body having a central chamber therein opening to opposite ends thereof, a mixed water outlet opening from one end of said chamber, a cold water outlet opening from the opposite end of said chamber, a valve seating member in said chamber upstream of said cold water outlet and having a central orifice leading therethrough, a cold water inlet into said chamber upstream of said valve seating member, a valve engageable with said orifice on the upstream side of said valve seating member and having a stem extending through said orifice, a carrier in said chamber adjacent said mixed water outlet, a thermal element seated on said carrier and having a power member engaging said stem, a retainer mounted on said stem, a spring seated on said seating member and engageable with said retainer and biasing said stem into engagement with said power member and retaining said thermal element in said carrier, a hot water inlet leading into said valve body, spaced to one side of said chamber, a hot water outlet leading directly from said hot water inlet, a communicating passageway between said hot water inlet and said chamber on the upstream side of said hot water outlet, and a check valve in said communicating passageway between said hot water inlet and said chamber, loaded to close off the free flow of hot water to said chamber when said hot water outlet is open and to open the passage from said cold water inlet into said chamber upon a predetermined back pressure in said hot water outlet.

References Cited in the file of this patent

UNITED STATES PATENTS

| | | |
|---|---|---|
| 1,891,926 | Hall | Dec. 27, 1932 |
| 1,942,270 | Resek | Jan. 2, 1934 |
| 2,326,096 | Dillman | Aug. 3, 1943 |
| 2,528,422 | Chace | Oct. 31, 1950 |
| 2,657,859 | Wangenheim | Nov. 3, 1953 |